A. ENGLUND.
BREAD SLICER.
APPLICATION FILED APR. 29, 1907.

899,962.

Patented Sept. 29, 1908.

WITNESSES:
T. Eastberg
G. H. Towne

INVENTOR
Axel Englund
BY Geo. H. Strong
ATTORNEY

UNITED STATES PATENT OFFICE.

AXEL ENGLUND, OF MOUNTAIN VIEW, CALIFORNIA.

BREAD-SLICER.

No. 899,962.　　　Specification of Letters Patent.　　　Patented Sept. 29, 1908.

Application filed April 29, 1907. Serial No. 370,823.

*To all whom it may concern:*

Be it known that I, AXEL ENGLUND, a citizen of Finland, residing at Mountain View, in the county of Santa Clara and State of California, have invented new and useful Improvements in Bread-Slicers, of which the following is a specification.

My invention relates to an apparatus for slicing bread and like articles which are in the form of loaves.

It consists in the combination of parts, and in details of construction which will be more fully explained by reference to the accompanying drawings, in which—

Figure 1:
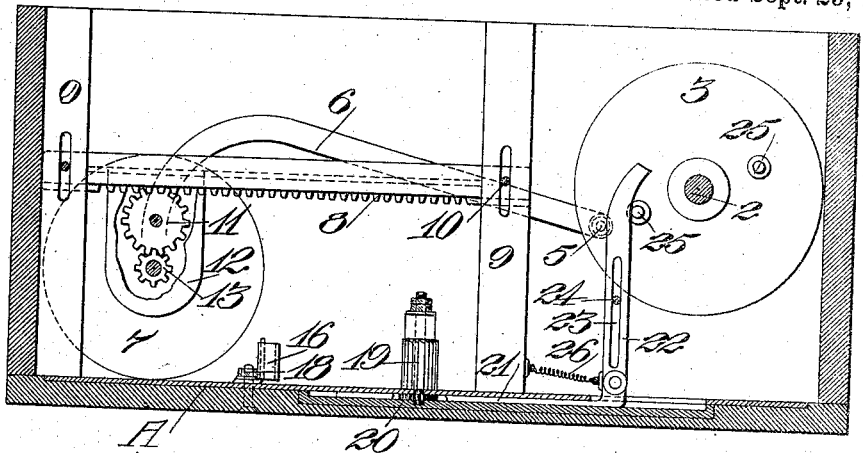
Figure 2:
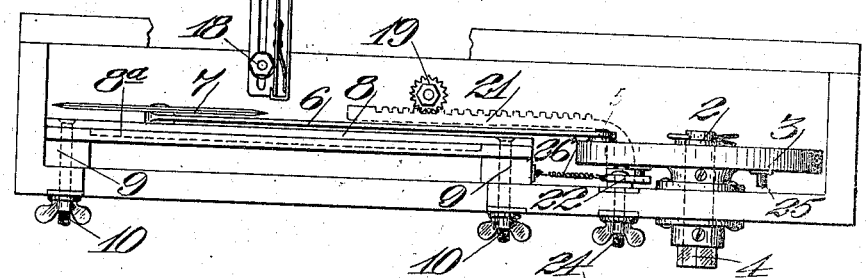
Figure 3:
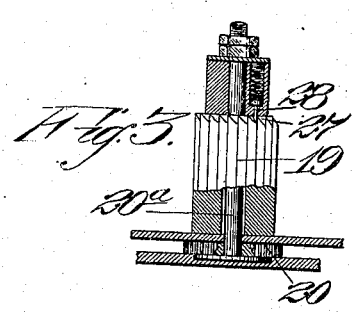
Figures 4, 5:
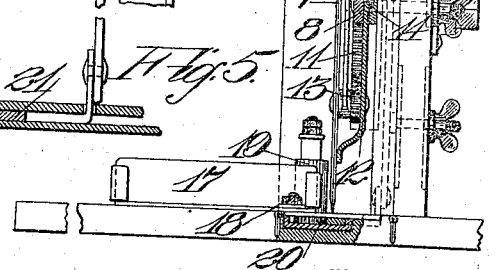

Figure 1 is a side elevation of my apparatus. Fig. 2 is a plan view. Fig. 3 is an elevation partly in section of the feed roller. Fig. 4 is a partial detailed plan of the feed roller actuating mechanism. Fig. 5 is an end view showing the cutter, gears, rack and connected parts.

It is the object of my invention to provide an apparatus by which bread and like substances may be sliced by the action of a rolling cutter.

As shown in the drawing, A is a base of any suitable character, having sides, ends and uprights for supporting the various parts of the mechanism, and said structure may be made foldable in such a manner that the mechanism can be inclosed therein when out of use. Near one end of the structure is journaled a shaft 2 upon which is carried a wheel or disk 3, and the shaft and disk may be turned by a crank applied to a square projecting end 4 of the shaft, or by other suitable or desired means. Upon the disk is a crank pin 5, with which one end of a curved bar or pitman 6 is connected; the other end carrying a pivot pin upon which the cutting disk 7 is mounted.

8 is a rack bar having the teeth on its lower edge and said rack bar is adjustably supported in slots in posts 9 by screw-bolts and lock nuts 10, the posts being vertically slotted so that the bar may be raised or depressed and locked in any desired position, and this allows the cutting disk and connected operating mechanism to be raised or depressed with relation to the base or floor over which the cutter is movable.

11 is a gear-wheel mounted upon the shaft which is carried in a frame or guide 12, and below this gear is a pinion 13 which is fixed to the shaft of the cutting disk 7. The frame 12 has upon its upper edge a flange or rib 14, and this is adapted to travel in a slot in the side of bar 8. Its office is to retain the gear-carrying frame, and maintain the upper gear in mesh with the rack, and the pinion in mesh with this upper intermediate gear, at the same time allowing the frame or support 12 to be moved backward and forward by the revolution of the crank-wheel or disk 3, and the resultant reciprocation of the connecting rod or pitman 6 which is connected with the slidable frame 12.

The operation of this portion of the apparatus will be as follows: When the disk 3 is turned, its revolution acting upon the pitman 6 causes the guided frame or support 12 to slide with relation to the rack bar which forms its guide as previously described. This motion causes the gear 11 to revolve, and the motion transmitted from this gear revolves the pinion 13 in the opposite direction, and with it the cutting disk 7, and this revolution of the disk while at the same time traveling over the base upon which the bread is supported, produces an independent revolution of the disk, while it is being reciprocated across the board, and this independent revolution makes a drawing cut which is very effective in severing slices from friable or tough material, which is difficult to cut smoothly by any other process. The loaf of bread is laid upon the base or floor, and one side of it lies against a spring-pressed plate 16, the springs holding the plate against the loaf so that the feed mechanism to be hereafter described, will take a firm hold to advance the loaf after each stroke of the pitman and corresponding movement of the cutting disk. This plate 16 and the springs are carried upon a slotted bar 17, which may be moved out or in to accommodate the character of the loaf to be cut. This bar is secured by a bolt and lock nut as at 18 and it will be seen that it may be thus turned at an angle with the line of travel of the cutter, so that if it is desired to slice the bread in this fashion, the bread will be presented to the cutter at whatever angle the support 16 may cause it to take.

In order to feed the bread forward I have shown a toothed roller 19 which is journaled in such position that the loaf of bread will pass between the elastic or spring-pressed plate 16 and this roller 19. The roller is revolved so that its teeth engaging the side of the loaf of bread, will advance the bread after each cut has been made. The revolution of the roller is effected by the pinion 20 fixed to the shaft of the roller below the surface upon which the bread lies, and this pinion is engaged by a rack 21 slidable in the channel corresponding with the position of the pinion. This rack 21 extends to a point contiguous to the crank-wheel 3, and has connected with it an upwardly extending arm 22 having a vertical slot 23 through which a fulcrum pin 24 passes. Upon the crank disk 3 are projecting pins 25, and these pins are so placed with relation to the bar 22 that they contact with its upper end as they pass, and thus tilt the bar 22 about its fulcrumed bolt 24, and correspondingly reciprocate the rack 21, and thus revolve the feed roller 19 and advance the bread after each slice has been cut. The bar 22 and the rack may be returned by any suitable device. I have here shown a spiral spring 26 which is sufficient for the purpose.

In order to prevent the feed-roller 19 from rotating backwardly upon the return of the moving parts just described I have shown the upper end of the roller teeth as having a ratchet form as at 27, and a spring-pressed pin 28 engages with these ratchet teeth. The incline of one side of the ratchet-teeth allows the pin which is carried with the shaft of the pinion 20 to pass over the teeth without moving the roller, the latter being loosely journaled upon the vertical shaft 20ª of the pinion 20. When the pinion 20 and its shaft are turned in the opposite direction by the reciprocation of the rack 21, the pin 28 will engage the substantially vertical edges of the ratchet teeth, and will thus turn the ratchet and the roller 19, of which it forms a part, and advance the bread as previously described.

Having thus described my invention, what I claim and desire to secure by Letters Patent is—

1. In a bread and like slicing apparatus, a simultaneously revoluble and reciprocating cutting disk, a support for the bread in the path of travel of the disk, said support including an elastic back, a toothed roller engaging the opposite side of the loaf, and means for intermittently revolving said roller.

2. In an apparatus for slicing bread and the like, a revoluble cutting disk, a toothed rack bar fixed parallel with the line of travel of the disk, a pinion fixed to the disk shaft, a slidable support for the disk and pinion, a guide for said support, a gear wheel mounted upon said support between the pinion and rack bar and engaging the teeth of both, and engaging the teeth of the rack bar from below whereby the disk is guided in a horizontal direction, means for reciprocating the slidable support, and a loaf-supporting device located in the path of reciprocation of the disk.

3. In an apparatus for slicing bread and the like, a toothed rack bar, a frame slidable parallel with the rack bar, a guide in which said frame is movable, a cutting disk journaled in said frame having a pinion upon its shaft, a similarly journaled gear-wheel below the rack-bar, the teeth of which engage those of the pinion and the rack-bar, a revoluble crank disk, a connecting rod or pitman between the slidable frame and the crank disk, whereby the disk is simultaneously reciprocated and rotated, and a support whereby the loaf is held in the path of travel of the cutter.

4. In an apparatus of the character described, a circular cutting disk, means for simultaneously reciprocating and revolving said disk, an elastic support against which the loaf is held in the path of travel of the cutter, a locking device by which said support may be held at any angle with the line of travel of the cutter, a toothed feed roller engaging the opposite side of the loaf, means by which said roller is revolved to advance the loaf after each cut.

5. In an apparatus of the character described, a circular cutter, means for simultaneously reciprocating and revolving the cutter, an adjustable support against which one side of the loaf is supported, a toothed roller engaging the opposite side, a pinion fixed to the roller shaft, a rack bar engaging the pinion and mechanism acting intermittently of the movement of the cutter, whereby the feed roller is rotated and the loaf advanced.

6. In an apparatus of the character described, a circular cutting disk, mechanism including a crank disk, connecting pitman, rack bar and pinions whereby the cutter is simultaneously reciprocated and revolved, an elastic support against which one side of the loaf contacts, a toothed feed-roller engaging the opposite side of the loaf, a pinion connected with the roller-shaft, a guided slidable rack-bar engaging the pinion, a fulcrumed lever connecting with the rack-bar, and pins upon the crank disk engaging the lever to reciprocate the rack and revolve the roller.

7. In an apparatus of the character described, a circular cutting disk, mechanism by which the disk is simultaneously reciprocated and revolved, a loaf guide and support a toothed roller and mechanism including a pinion upon the roller shaft, and a reciprocating rack engaging the pinion whereby the roller is rotated to advance the loaf, and a pawl and ratchet mechanism by which the roller is revolved in only one direction by the reciprocation of the rack.

8. In an apparatus of the character described, a circular cutting disk, mechanism by which the disk is simultaneously reciprocated and revolved, an elastic support against which one side of the loaf is supported, a revoluble ratchet controlled and toothed roller engaging the other side of the loaf, mechanism actuating in unison with the reciprocations of the cutting disk whereby the roller is revolved and the loaf advanced between the reciprocations of the cutter, and a fulcrumed lever by which the roller revolving mechanism is actuated.

9. In an apparatus of the character described, a circular cutting disk, mechanism by which the disk is simultaneously reciprocated and revolved, an elastic and adjustable back against which one side of the loaf is supported, a vertically journaled toothed roller engaging the other side of the loaf, mechanism by which said roller is revolved between the reciprocations of the cutter, said last named mechanism comprising a toothed ratchet formed upon the upper end of the roller, a shaft upon which the roller is loosely turnable, a pinion fixed to said shaft, and a rack bar through which motion is transmitted to revolve the pinion and shaft, a spring-pressed pawl carried upon the upper end of the shaft and engaging the ratchet teeth of the roller to advance the roller in one direction, and to allow it to remain stationary when the shaft is revolved in the opposite direction.

In testimony whereof I have hereunto set my hand in presence of two subscribing witnesses.

AXEL ENGLUND.

Witnesses:
E. L. CHAPMAN,
A. B. ENGLUND.